W. BARNES, Jr.
SHAFT BEARING.
APPLICATION FILED OCT. 8, 1910.
1,154,227.
Patented Sept. 21, 1915.
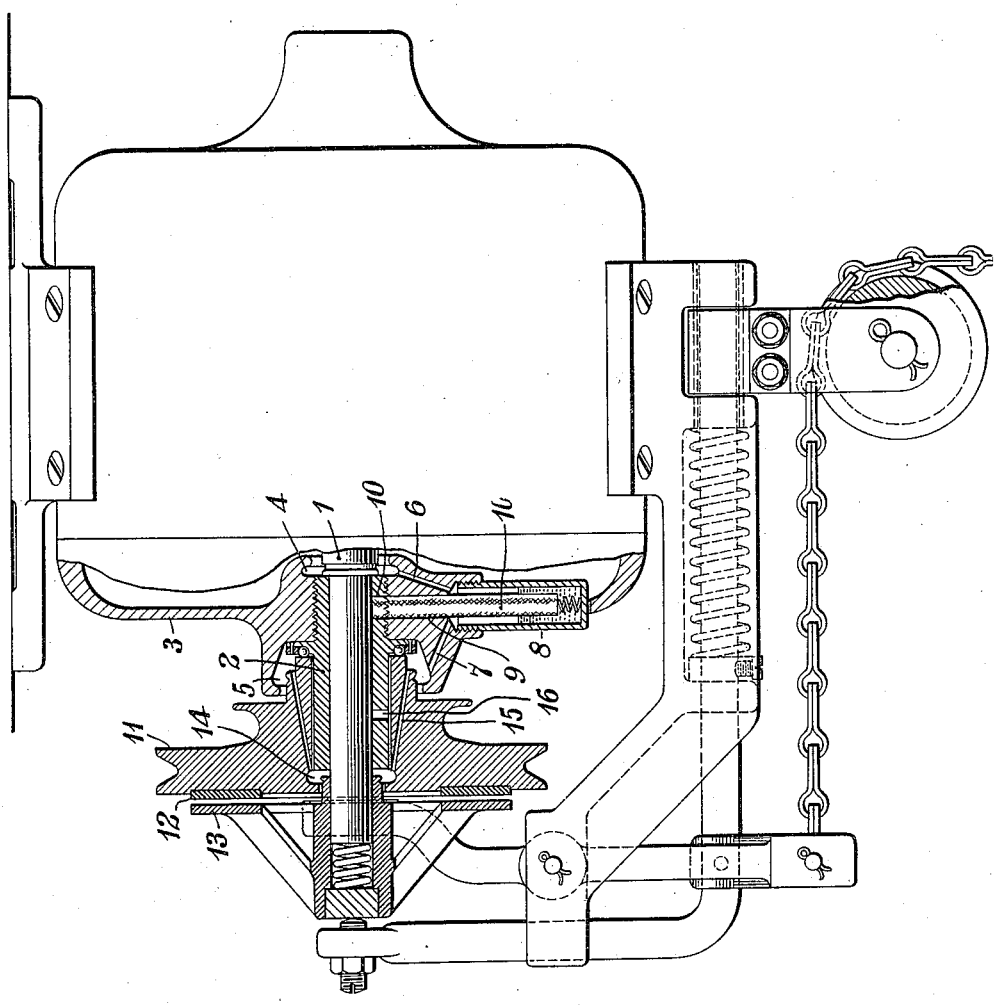
WITNESSES:
C. L. Belcher
Otto S. Schairer
INVENTOR
Wilfred Barnes Jr.
BY
Wesley G. Carr
ATTORNEY

UNITED STATES PATENT OFFICE.

WILFRED BARNES, JR., OF WILKINSBURG, PENNSYLVANIA, ASSIGNOR TO WESTINGHOUSE ELECTRIC AND MANUFACTURING COMPANY, A CORPORATION OF PENNSYLVANIA.

SHAFT-BEARING.

1,154,227.  Specification of Letters Patent.  Patented Sept. 21, 1915.

Application filed October 8, 1910. Serial No. 586,073.

*To all whom it may concern:*

Be it known that I, WILFRED BARNES, Jr., a citizen of the United States, and a resident of Wilkinsburg, in the county of Allegheny and State of Pennsylvania, have invented a new and useful Improvement in Shaft-Bearings, of which the following is a specification.

My invention relates to shaft bearings, and it has for its object to provide a simple structure for the purpose indicated, the relatively movable parts of which shall be kept well oiled and from which oil may not escape and be thrown upon surrounding parts.

The single figure of the accompanying drawing is a side and sectional view of an electric motor and a transmission device constructed in accordance with the present invention.

The invention is here shown as applied to an electric motor, the shaft 1 of which is provided with a relatively long bearing sleeve 2, one end of which is secured in the end bracket 3 of the motor. The end member 3 is provided, in both its inner and outer faces, with circumferential grooves or recesses 4 and 5, respectively, surrounding the shaft, which grooves are connected by means of passages 6 and 7, respectively, with an oil well or receptacle 8, oil being conducted from the said receptacle to the shaft, through a passage 9 and an aperture in the sleeve 2, by means of a wick or other suitable device 10.

A portion of the sleeve 2 projects from the outer face of the bracket 3 of the motor and loosely mounted thereon is a pulley 11, to the outer annular face of which is secured a clutch member 12 in the form of a washer composed of rubber, cork or other suitable material with which another clutch member 13 is adapted to engage, the member 13 being keyed to the end of the shaft so as to rotate therewith but so as to be capable of movement longitudinally thereof. The clutch member 13 may be moved into engagement with the member 12 by any suitable means (not shown), in order to permit the shaft to drive the pulley 11.

The smaller inner end of the pulley 11 extends into the recess 5 in the outer face of the bracket 3, so that oil which accumulates thereon may be thrown into the said recess and be conducted, through the passage 7, back into the oil receptacle 8. The outer larger end of the pulley 11 extends somewhat beyond the end of the sleeve 2 and is provided with an internal circumferential groove or recess 14 that is connected, by means of longitudinal passages 15, to the inner annular face of the pulley 11. The said passages are inclined to the axis of the motor and serve to conduct oil, that accumulates at the outer end of the pulley, to the inner end thereof, where it is thrown into the circumferential groove or recess 5 in the end member of the motor and, from there, is conducted into the oil receptacle 8. The sleeve 2 is provided with a slot or aperture 16 through which oil is conducted from the inner to the outer circumferential surface of the sleeve for lubricating both the shaft and the pulley.

It will thus be seen that all of the relatively movable parts are well lubricated, while all excess oil is conducted back to the oil receptacle and does not readily accumulate upon external parts of the device, and, consequently, it is not thrown therefrom upon adjacent articles which might be soiled or ruined thereby.

I claim as my invention:

1. The combination with a shaft, a bearing sleeve therefor, a support for one end of the sleeve having an oil receptacle, an annular recess and a conduit leading therefrom to the receptacle, of a member rotatably mounted upon the sleeve and projecting into the recess in the sleeve support and having inclined longitudinal passages leading to the said recess.

2. The combination with a shaft, a bearing sleeve therefor, and a support for one end of the sleeve having an oil receptacle, an annular recess and a conduit leading therefrom to the receptacle, of a member rotatably mounted on the sleeve and projecting into the recess in the sleeve support, the said member overhanging one end of the sleeve and having passages inclined to its axis and extending from the said overhanging portion to the recess in the sleeve support.

3. The combination with a shaft, a bearing sleeve therefor, and a support for one end of the sleeve having an oil receptacle, an annular recess and a conduit leading therefrom to the receptacle, of a member rotatably mounted on the sleeve, one end of which projects into the recess in the sleeve support and the other end of which extends beyond the sleeve, the said member having an annular groove adjacent to the end of the sleeve and passages that are inclined to the axis thereof and extend from the said groove to the annular recess in the sleeve support.

4. The combination with a shaft, a bearing sleeve therefor and a support for one end of the sleeve having an oil receptacle, annular recesses at the respective sides of said receptacle and conduits leading from said recesses to the receptacle, of a member rotatably mounted on the sleeve and having an annular groove and inclined longitudinal passages leading therefrom to one of the recesses in the sleeve support.

In testimony whereof, I have hereunto subscribed my name this 22nd day of Sept., 1910.

WILFRED BARNES, Jr.

Witnesses:
  OTTO S. SCHAIRER,
  B. B. HINES.

Copies of this patent may be obtained for five cents each, by addressing the "Commissioner of Patents. Washington, D. C."